(12) United States Patent
Quach et al.

(10) Patent No.: US 10,801,407 B2
(45) Date of Patent: Oct. 13, 2020

(54) CORE ASSEMBLY FOR GAS TURBINE ENGINE

(71) Applicant: United Technologies Corporation, Hartford, CT (US)

(72) Inventors: San Quach, East Hartford, CT (US); Tracy A. Propheter-Hinckley, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1198 days.

(21) Appl. No.: 14/749,000

(22) Filed: Jun. 24, 2015

(65) Prior Publication Data

US 2016/0376989 A1    Dec. 29, 2016

(51) Int. Cl.
| | |
|---|---|
| *B22C 9/10* | (2006.01) |
| *F02C 7/12* | (2006.01) |
| *F01D 5/18* | (2006.01) |
| *F01D 5/28* | (2006.01) |
| *F01D 5/14* | (2006.01) |
| *F02C 3/04* | (2006.01) |

(52) U.S. Cl.
CPC .............. *F02C 7/12* (2013.01); *B22C 9/103* (2013.01); *F01D 5/14* (2013.01); *F01D 5/147* (2013.01); *F01D 5/186* (2013.01); *F01D 5/284* (2013.01); *F02C 3/04* (2013.01); *F05D 2230/21* (2013.01); *Y02T 50/676* (2013.01)

(58) Field of Classification Search
CPC ................................. B22C 9/10; B22C 9/103

USPC .................................................. 164/369, 370
See application file for complete search history.

(56) References Cited

U.S. PATENT DOCUMENTS

| | | | |
|---|---|---|---|
| 6,186,217 | B1 | 2/2001 | Sikkenga et al. |
| 6,929,054 | B2 | 8/2005 | Beals et al. |
| 7,270,170 | B2 | 9/2007 | Beals et al. |
| 7,364,405 | B2 | 4/2008 | Cunha et al. |
| 7,731,481 | B2 | 6/2010 | Cunha et al. |
| 7,744,347 | B2 | 6/2010 | Cunha et al. |
| 8,109,725 | B2 | 2/2012 | Abdel-Messeh et al. |
| 8,157,527 | B2 | 4/2012 | Piggush et al. |
| 8,291,963 | B1 | 10/2012 | Trinks et al. |
| 8,303,252 | B2 | 11/2012 | Piggush |
| 2013/0341822 | A1 | 12/2013 | Ellgass et al. |
| 2014/0072447 | A1 | 3/2014 | Propheter-Hinckley |
| 2014/0102656 | A1 | 4/2014 | Propheter-Hinckley et al. |
| 2015/0053365 | A1 | 2/2015 | Mueller et al. |

FOREIGN PATENT DOCUMENTS

| | | |
|---|---|---|
| WO | 0032331 | 6/2000 |
| WO | 20150073202 | 5/2015 |

OTHER PUBLICATIONS

Extended European Search Report for European Application No. 16176117.6 dated Nov. 17, 2016.
SG Search Report and Written Opinion for SG Application No. 10201603741Q dated Nov. 5, 2016.

*Primary Examiner* — Kevin P Kerns
(74) *Attorney, Agent, or Firm* — Carlson, Gaskey & Olds, P.C.

(57) ABSTRACT

A core assembly includes a core that includes an exterior surface that has a recessed area that extends along the exterior surface. An insert includes a contact surface that corresponds to the recessed area.

15 Claims, 3 Drawing Sheets

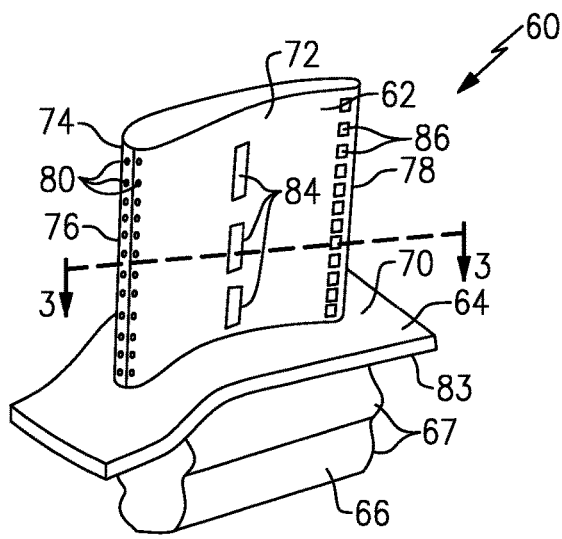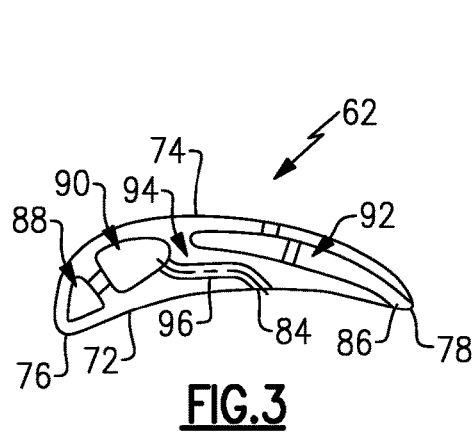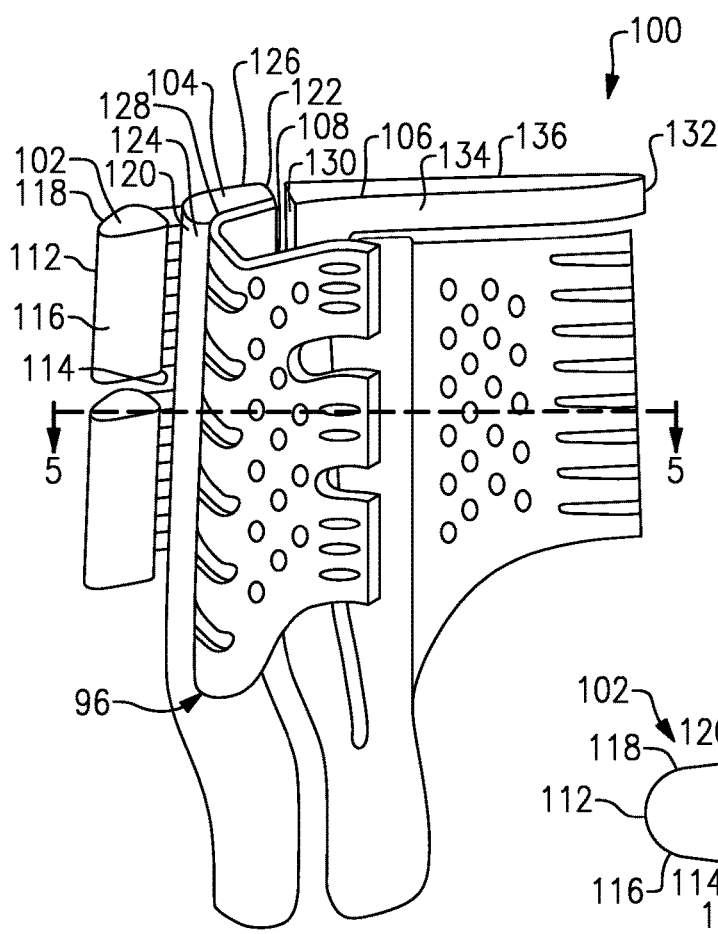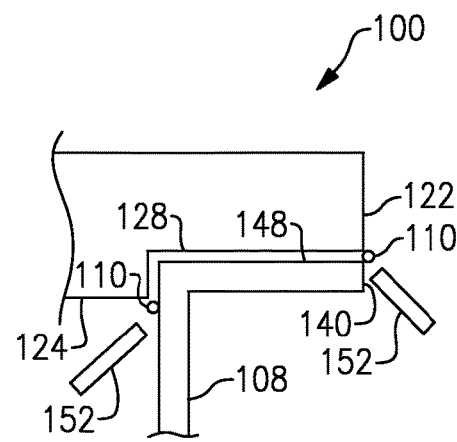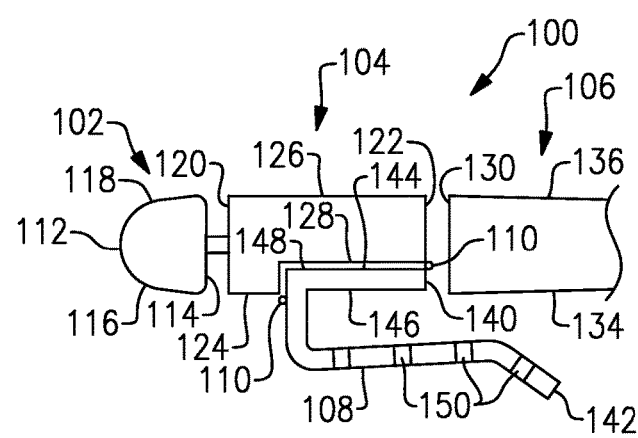

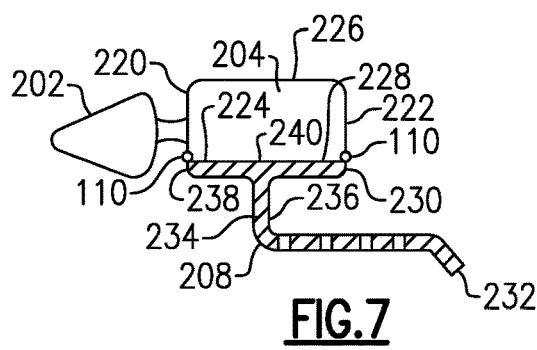
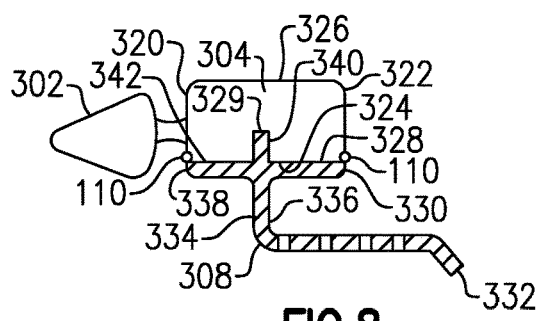
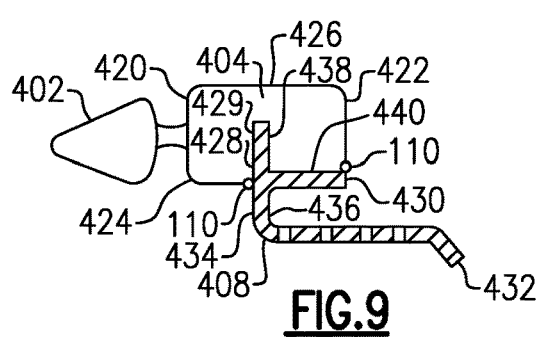
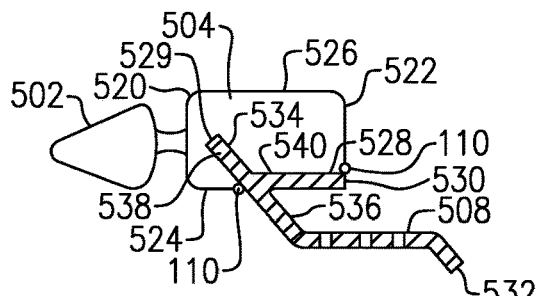
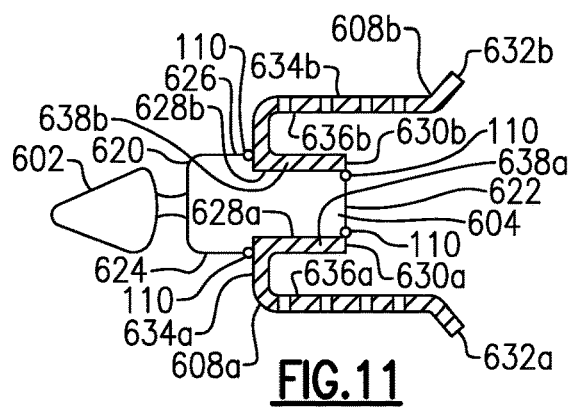
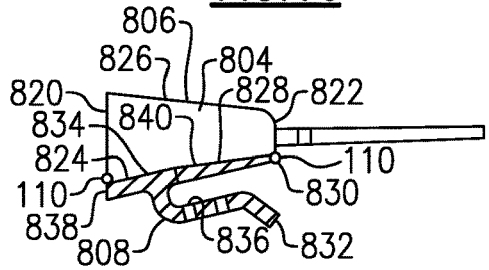
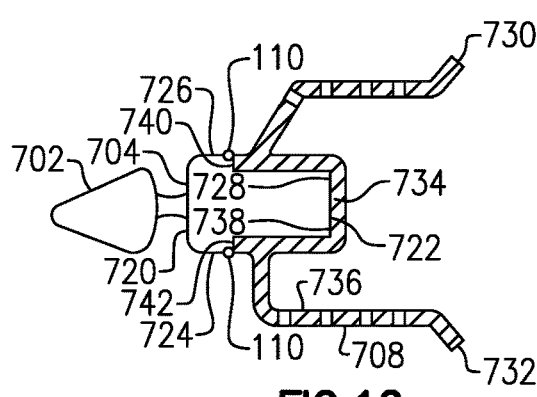
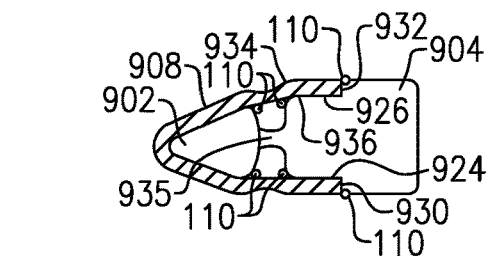
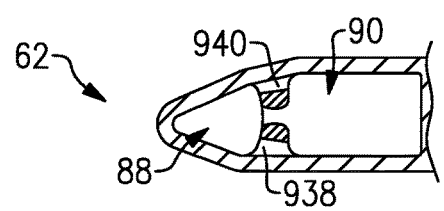

CORE ASSEMBLY FOR GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Turbine engine components, such as turbine blades and vanes, are operated in high temperature environments. To avoid deterioration in the components resulting from their exposure to high temperatures, it is necessary to provide cooling circuits within the components. Turbine blades and vanes are subjected to high thermal loads on both the suction and pressure sides of their airfoil portions and at both the leading and trailing edges. The regions of the airfoils having the highest thermal load can differ depending on engine design and specific operating conditions.

Minicore technology offers the potential to provide higher specific cooling passages for turbine components such as blade and vane airfoils, blade outer air seals (BOAS) and combustor or gas path panels. Minicore technology utilizes refractory metal cores to allow cooling circuits to be placed just under the surface of the hot wall through which cooling air flows and is expelled into the gas path. However, state of the art cooling circuits made using refractory metal cores can contain artifacts in the event of incomplete removal of adhesive material prior to casting. These defects and artifacts can reduce the cooling effectiveness provided by the cooling circuits and compromise the strength of the component.

SUMMARY

In one exemplary embodiment, a core assembly includes a core that includes an exterior surface that has a recessed area that extends along the exterior surface. An insert includes a contact surface that corresponds to the recessed area.

In a further embodiment of the above, the core includes an upstream end and a downstream end. A first side extends between the upstream end and downstream end. A second side extends between the upstream end and the downstream end.

In a further embodiment of any of the above, the insert is a refractory metal core that includes a first end, a second end, a first side, and a second side.

In a further embodiment of any of the above, the contact surface is located on the first side of the refractory metal core.

In a further embodiment of any of the above, the recessed area is located on at least one of the first side and the second side of the core. The first end of the refractory metal core is located adjacent the downstream end of the core.

In a further embodiment of any of the above, a tab extends from the first side of the refractory metal core.

In a further embodiment of any of the above, the tab extends to the upstream end of the core and the recessed area extends from the upstream end to the downstream end.

In a further embodiment of any of the above, the recessed area includes a slot for accepting the tab.

In a further embodiment of any of the above, the recessed area extends at least partially along the first side, the downstream end, and the second side. The contact surface abuts to the recessed area along the first side, the downstream end, and the second side.

In a further embodiment of any of the above, the refractory metal core includes a first tab that extends along the first side of the recessed area and a second tab that extends along the second side of the recessed area.

In a further embodiment of any of the above, a leading edge core has an upstream end, a downstream end, a first side, and a second side. A first recessed area is on the first side and the second side of the core. A second recessed area is on the first side, the upstream end, and the second side of the leading edge core. The refractory metal core abuts the first recessed area and the second recessed area.

In a further embodiment of any of the above, the insert includes at least one bend.

In a further embodiment of any of the above, the insert is secured within the recessed area with an adhesive.

In a further embodiment of any of the above, a component for a gas turbine engine is made from the core assembly of claim 1.

In another exemplary embodiment, a method of forming a core assembly includes forming a recessed area along an exterior surface of a core. A refractory metal core having a first end, a second end, a first side, and a second side is positioned into the recessed area such that the first side includes a contact surface adjacent the recessed area and the first end and the second end are spaced from the recessed area.

In a further embodiment of any of the above, the core includes an upstream end, a downstream end, a first side that extends between the upstream end and downstream end and a second side that extends between the upstream end and the downstream end.

In a further embodiment of any of the above, the recessed area is located on at least one of the first side of the core. The first end of the refractory metal core is located adjacent the downstream end of the core.

In a further embodiment of any of the above, a tab is aligned on the refractory metal core and a corresponding slot in the recessed area.

In a further embodiment of any of the above, the tab extends to the upstream end of the core and the recessed area extends from the upstream end to the downstream end of the core.

In a further embodiment of any of the above, the recessed area extends along the first side, the downstream end, and the second side of the core. The contact surface on the refractory metal core abuts the recessed area along the first side, the downstream end, and the second side.

In a further embodiment of any of the above, the refractory metal core includes a first tab that extends along the first side of the recessed area and a second tab that extends along the second side of the recessed area.

In a further embodiment of any of the above, a leading edge core has an upstream end, a downstream end, a first side, and a second side. A first recessed area is on the first side and the second side of the core. A second recessed area is on the pressure side, the upstream end, and the second side of the leading edge core. The refractory metal core extends between the first recessed area and the second recessed area.

BRIEF DESCRIPTION OF THE DRAWINGS

FIG. 2 shows an example gas turbine engine component.

FIG. 3 is a cross-sectional view taken along line 3-3 of FIG. 2.

FIG. 4 is perspective view of an example ceramic core assembly.

FIG. 5 is a cross-sectional view taken along line 5-5 of FIG. 4.

FIG. 6 is an enlarged view of FIG. 5.

FIG. 7 is a cross-sectional view of another example ceramic core assembly.

FIG. 8 is a cross-sectional view of yet another example ceramic core assembly.

FIG. 9 is a cross-sectional view of a further example ceramic core assembly.

FIG. 10 is a cross-sectional view of a further example ceramic core assembly.

FIG. 11 is a cross-sectional view of a further example ceramic core assembly.

FIG. 12 is a cross-sectional view of a further example ceramic core assembly.

FIG. 13 is a cross-sectional view of a further example ceramic core assembly.

FIG. 14 is a cross-sectional view of a further example ceramic core assembly.

FIG. 15 is a cross-sectional view of a cast component from the ceramic core assembly of FIG. 14.

DETAILED DESCRIPTION

Figure 1:
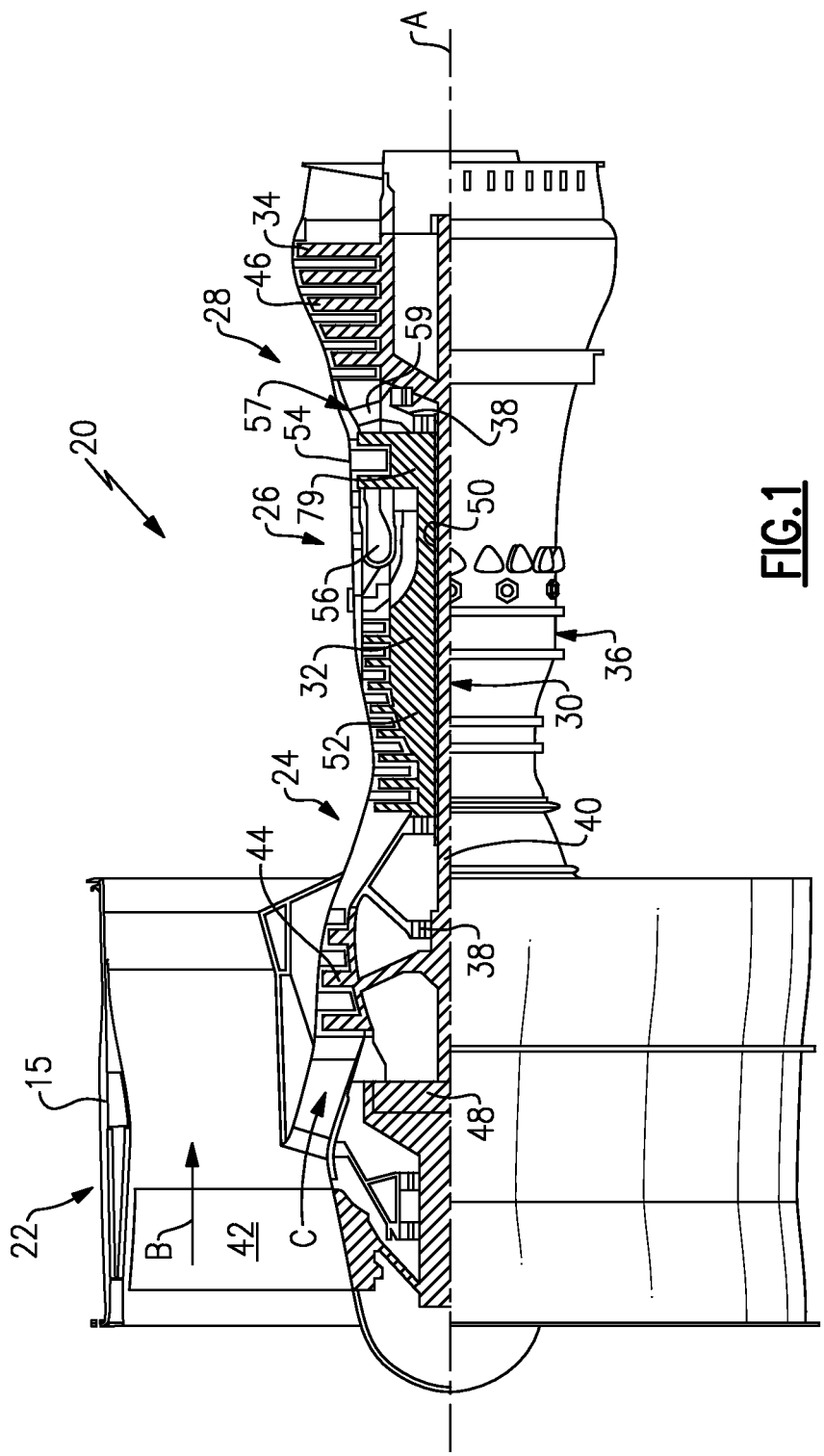
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

FIG. 2 illustrates an example gas turbine engine component 60. In the illustrated example, the component 60 includes an airfoil 62, a platform 64, and optionally a root portion 66. In the illustrated example, the component 60 is a turbine blade. However, the component 60 could also be a vane, a compressor blade, a combustor liner, a blade outer air seal, or any structure that with cooling features formed from ceramic cores or core of other material. The component 60 is configured to form a circumferential ring surrounding the engine axis A when jointed with additional similar components 60. In this disclosure, circumferential or circumferentially spaced is relative to a circumference surrounding the engine axis A of the gas turbine engine 20 unless otherwise specified.

The radially outer side 70 of the platform 64 forms a radially inner boundary for fluid traveling over the component 60. The root portion 66 extends radially inward from the platform 64 to retain the component 60 to a turbine rotor 79 (FIG. 1). The root portion 66 is located on an opposite side of the platform 64 from the airfoil 62 on a radially inner side 83. The root portion 66 includes teeth 67 located on opposite sides of the root portion 66 for engaging complimentary shaped receptacles on the turbine rotor 79 of the gas turbine engine 20.

As shown in FIG. 2, a first plurality of cooling holes 80 are spaced radially along a leading edge 76 of the airfoil 62 on both a pressure side 72 and a suction side 74. Although the cooling holes 80 in the illustrated example are circular, other shapes such as elliptical holes, oval holes, oblong holes, and race-track shaped holes could be used.

A plurality of cooling slots 84 are spaced radially along the pressure side 72 of the airfoil 62. In the illustrated example, the plurality of cooling slots 84 is axially aligned and extends in a radial direction. However, the plurality of cooling slots 84 could be axially spaced from each other.

A plurality of trailing edge cooling holes 86 are spaced radially along the pressure side 72 of the airfoil 62 immediately upstream of a trailing edge 78.

As shown in FIG. 3, the airfoil 62 includes internal cooling passages, such as a leading edge cooling passage 88, an intermediate cooling passage 90, and a trailing edge cooling passage 92. In the illustrated example, the intermediate cooling passage 90 feeds cooling airflow to the plurality of cooling slots 84 to create a cooling film over the pressure side 72 as the cooling airflow travels out of the plurality of cooling slots 84 and towards the trailing edge 78. However, the plurality of cooling slots 84 could be fed from either the leading edge cooling passage 88 or the trailing edge cooling passage 92.

The plurality of cooling slots 84 are each fed by a slot passage 94 forming an internal cooling circuit 96 (a network of cooling passages). The slot passage 94 for the cooling slot 84 is formed by an investment casting process. In one example investment casting process, ceramic cores are used to form the leading edge cooling passage 88, an intermediate cooling passage 90, and a trailing edge cooling passage 92. Inserts, such as a refractory metal core (RMC), can be used to form the internal cooling circuits 96 for receiving cooling airflow from the cooling passages 88, 90, and 92 formed by the ceramic core elements.

In one investment casting method, the ceramic feed core and the RMC are formed separately. The RMC is then secured to the ceramic feed core, typically using a ceramic adhesive or glue. A wax pattern is formed over the RMC and ceramic feed cores, which form a core assembly. A ceramic shell is then formed over the wax pattern and the wax pattern is removed from the shell. Molten metal is introduced into the ceramic shell. The molten metal, upon cooling, solidifies and forms the component 60. The ceramic feed cores form the cooling passages 88, 90, and 92 in the component 60 and the RMC at least partially defines the internal cooling circuit 96. The ceramic shell is then removed from the cast part. Thereafter, the ceramic feed core and the RMC are removed, typically chemically, using a suitable removal technique. Removal of the RMC leaves the internal cooling circuit 96 within the component 60.

FIG. 4 illustrates an example core assembly 100 for forming the component 60. The configuration of ceramic cores within the core assembly 100 allows access for removal of adhesive accumulated between the ceramic cores and the RMC before casting. The core assembly 100 includes a leading edge ceramic core 102, an intermediate ceramic core 104, and a trailing edge ceramic core 106. The leading edge ceramic core 102, the intermediate ceramic core 104, and the trailing edge ceramic core 106 form the leading edge cooling passage 88, the intermediate cooling passage 90, and the trailing edge cooling passage 92, respectively. In the illustrated example, an intermediate RMC 108 is attached to the intermediate ceramic core 104. Although the illustrated example only shows one RMC 108 attached to the intermediate ceramic core 104, additional RMCs could be attached to the leading edge ceramic core 102 and the trailing edge ceramic core 106.

The RMC 108 is used to form the internal cooling circuit 96 within the wall of the component 60. The cooling circuit receives cooling fluid from the intermediate passage 90 once the component 60 is cast. In order for the internal cooling circuits 96 in the component 60 to receive cooling fluid from the intermediate passage 90, the intermediate ceramic core 104 and the RMC 108 must be in contact with one another. The RMC 108 is secured to the intermediate ceramic core 104 to maintain contact during the casting process. In some embodiments, core assembly 100 can contain more than one intermediate ceramic core 104 and associated RMC 108.

During casting, the ceramic cores 102, 104, and 106 form the cooling passages 88, 90, and 92 within the airfoil 62 that travel in a generally spanwise direction (e.g., radially through a central region of the component 60). The leading edge ceramic core 102 includes an upstream surface 112, a downstream surface 114, a pressure side surface 116, and a suction side surface 118. The intermediate ceramic core 104 includes an upstream surface 120, a downstream surface 122, a pressure side surface 124, and a suction side surface 126. The trailing edge ceramic core 106 includes an upstream surface 130, a downstream surface 132, a pressure side surface 134, and a suction side surface 136.

In the illustrated example, a recessed area 128 is formed along the pressure side surface 124 of the intermediate ceramic core 104 and extends in a spanwise and axial direction. In another example, the recessed area 128 could be formed on the suction side surface 126 or both the pressure side surface 124 and the suction side surface 126 of the intermediate ceramic core 104. The recessed area 128 can extend the full span length of the intermediate ceramic core 104 or only a portion of the full length of the intermediate ceramic core 104.

As shown in FIGS. 4 and 5, the intermediate RMC 108 includes a first end 140, a second end 142, a first side 144, and a second side 146. The first side 144 includes a contact surface 148 that is accepted within the recessed area 128. In the illustrated example, the recessed area 128 extends from the downstream surface 122 on the intermediate ceramic core 104 to approximately 40-80% of the chord length of the intermediate ceramic core 104. In another example, the contact surface 148 extends between 20-100% of the chord length of the intermediate ceramic core 104.

The RMC 108 is attached to the recessed area 128 of the intermediate core 104 with a ceramic adhesive or glue 110. In one example, the ceramic adhesive 110 is applied to the RMC 108 prior to insertion into the recessed area 128 in the intermediate ceramic core 104. The ceramic adhesive 110 secures the contact surface 148 within the recessed area 128 to form the cooling flow path between the intermediate cooling passage 90 and the internal cooling circuit 96 in the cast component 60.

Once cast, openings 150 in the RMC 108 form a plurality of pedestals or other features that direct cooling fluid through the internal cooling circuit 96. The openings 150 can be circular, oblong, racetrack-shaped, teardrop-shaped or any other shape depending on the flow control needs of the cooling circuit. The RMC 108 can include one or more bends between the first and second ends 140 and 142 as shown in FIGS. 4 and 5. The bends in the RMC 108 allow the RMC 108 to be fed with cooling airflow from the intermediate cooling passage 90 and still provide a heat shielding effect on the intermediate passage 90 to reduce the temperature of the cooling airflow as it passes through the intermediate passage 90.

The ceramic adhesive 110 used to secure the RMC 108 to the intermediate ceramic core 104 can migrate and wick along the interface between intermediate ceramic core 104 and the RMC 108. The overflow of the ceramic adhesive 110 can create undesired artifacts in the cast component, such as inclusions and fins, which can reduce the cooling effectiveness of the internal cooling circuits formed by the RMC 108 or impact the strength of the component 60.

To avoid the formation of these unwanted artifacts, excess ceramic adhesive 110 should be removed prior to forming the wax pattern. As shown in FIG. 6, a tool 152 is typically used to remove surplus ceramic adhesive 110. The tool 152 can only remove surplus ceramic adhesive 110 along the regions of the RMC 108 that the tool 152 can access. Certain configurations of RMCs and ceramic cores prevent access to one side of the RMC where the ceramic adhesive 110 can wick, however. The embodiments described herein provide configurations that allow ceramic adhesive 110 removal from the interface of the RMC and the ceramic cores.

As shown in FIG. 6, ceramic adhesive 110 has flowed out of the recessed area 128 and along the first side 140 of the RMC 108. The ceramic adhesive 110 outside of the recessed area 128 can create the unwanted artifacts in the resulting cast component as described above. FIG. 6 also illustrates the tool 152 that can be used to remove a surplus of the ceramic adhesive 110 that has flowed out of the recessed area 128 along the sides of the RMC 108 adjacent the intermediate ceramic core 104. The tool 152 can be used to remove ceramic adhesive 110 on both the leading edge of the recessed area 128 and the first end 140 of the RMC 108 along the downstream surface 122 of the intermediate ceramic core 104. Some prior art configurations would not allow the tool 152 to be used to remove the ceramic adhesive 110 from adjacent the RMC 108 due to spatial constraints.

The tool 152 can be used to remove the ceramic adhesive 110 before or after the leading edge ceramic core 102, the intermediate ceramic core 104, and the trailing edge ceramic core 106 are assembled into the core assembly 100. Because the ceramic cores 102, 104, and 106 are separate elements, each ceramic core 102, 104, and 106 and adjoining RMC can be assembled separately. That is, RMC 108 can be secured to the intermediate ceramic core 104 with ceramic adhesive 110 apart from the other ceramic cores and RMCs. The ceramic adhesive 110 can be removed by the tool 152 before the intermediate ceramic core 104 and the RMC 108 are assembled with the leading edge ceramic core 102 and the trailing edge ceramic core 106 to form the core assembly 100. The ceramic adhesive 110 can be removed from both sides of the RMC 108 since no obstructions prevent access around the RMC 108. Alternatively, ceramic adhesive 110 can be removed by the tool 152 after two or more of the ceramic cores of the core assembly 100 have been assembled.

FIG. 7 illustrates another example leading edge ceramic core 202 and another example intermediate ceramic core 204. Although FIG. 7 does not include a trailing edge ceramic core, additional ceramic cores such as additional intermediate ceramic cores and trailing edge ceramic cores could be utilized. The intermediate ceramic core 204 includes an upstream surface 220, a downstream surface 222, a pressure side surface 224, and a suction side surface 226. In the illustrated example, a recessed area 228 is formed along the entire pressure side 224 of the intermediate core 204.

An intermediate RMC 208 is secured to the recessed area 228. The RMC 208 includes a first end 230, a second end 232, and a first side 234, and a second side 236. A tab 238 extends from the first side 234 toward the upstream surface 220 of the intermediate ceramic core 204. A contact surface 240 extends along the first side of the RMC 208 from the first end 230 to a distal end of the tab 238 for mating with the recessed area 228.

Excess ceramic adhesive 110 forms at the interfaces of the RMC 208 and the intermediate ceramic core 204. The position of the excess ceramic adhesive 110 allows for easy access for removal by the tool 152.

FIG. 8 illustrates another example leading edge ceramic core 302 and another example intermediate ceramic core 304. Although FIG. 8 does not include a trailing edge ceramic core, additional ceramic cores such as additional intermediate ceramic cores and trailing edge ceramic cores could be utilized. The intermediate ceramic core 304 includes an upstream surface 320, a downstream surface 322, a pressure side surface 324, and a suction side surface 326. In the illustrated example, a recessed area 328 is formed along the entire pressure side 324 of the intermediate core 304. The recessed area 328 includes a central slot 329 extending along a spanwise length of the intermediate ceramic core 304.

An intermediate RMC 308 includes a first end 330, a second end 332, and a first side 334, and a second side 336. A first tab 338 extends from the first side 334 toward the upstream surface 320 of the intermediate ceramic core 304 and a second tab 340 extends from the first side 334 toward into the slot 329. The RMC 308 is inserted into the recessed area 328 by aligning the second tab 340 on the RMC 308 with the slot 329 in the recessed area 328. A contact surface 342 extends from a distal end of the first tab 338 along the first side 334 around the second tab 340 to the first end 330 for mating with the recess 328.

Excess ceramic adhesive 110 forms at the interfaces of the RMC 308 and the intermediate ceramic core 304. The position of the excess ceramic adhesive 110 allows for easy access for removal by the tool 152.

FIG. 9 illustrates another example leading edge ceramic core 402 and another example intermediate ceramic core 404. Although FIG. 9 does not include a trailing edge ceramic core, additional ceramic cores such as additional intermediate ceramic cores and trailing edge ceramic cores could be utilized. The intermediate ceramic core 404 includes an upstream surface 420, a downstream surface 422, a pressure side surface 424, and a suction side surface 426. In the illustrated example, a recessed area 428 is formed along a portion of the pressure side 424 of the intermediate core 404. The recessed area 428 includes a slot 429 extending along a spanwise length of the intermediate ceramic core 404.

An intermediate RMC 408 includes a first end 430, a second end 432, a first side 434, and a second side 436. A first tab 438 extends from the first side 434 toward the slot 429. In one example, the first tab 438 is perpendicular to the first side 434 and in another example, the first tab 438 is within 10 degrees of perpendicular. The RMC 408 is inserted into the recessed area 428 by aligning the first tab 438 on the RMC 408 with the slot 429 in the recessed area 428. A contact surface 440 extends around the first tab 438 to the first end 432 of the RMC 408.

Excess ceramic adhesive 110 forms at the interfaces of the RMC 408 and the intermediate ceramic core 404. The position of the excess ceramic adhesive 110 allows for easy access for removal by the tool 152.

FIG. 10 illustrates another example leading edge ceramic core 502 and another example intermediate ceramic core 504. Although FIG. 10 does not include a trailing edge ceramic core, additional ceramic cores such as additional intermediate ceramic cores and trailing edge ceramic cores could be utilized. The intermediate ceramic core 504 includes an upstream surface 520, a downstream surface 522, a pressure side surface 524, and a suction side surface 526. In the illustrated example, a recessed area 528 is formed along a portion of the pressure side 524 of the intermediate core 504. The recessed area 528 includes an angled slot 529 extending along a length of the intermediate ceramic core 504.

An intermediate RMC 508 includes a first end 530, a second end 532, a first side 534, and a second side 536. A first tab 538 extends from the first side 534 toward the angled slot 529. In one example, the first tab 538 extends at an angle of 45 degrees relative to the pressure side 524 and in another example, the first tab 538 extends within 35-55 degrees relative to the pressure side 524. The RMC 508 is inserted into the recessed area 528 by aligning the first tab 538 on the RMC 508 with the angled slot 529 in the recessed area 528. A contact surface 540 extends around the first tab 538 to the first end 530 of the RMC 508.

Excess ceramic adhesive 110 forms at the interfaces of the RMC 508 and the intermediate ceramic core 504. The position of the excess ceramic adhesive 110 allows for easy access for removal by the tool 152.

FIG. 11 illustrates another example leading edge ceramic core 602 and another example intermediate ceramic core 604. Although FIG. 11 does not include a trailing edge ceramic core, additional ceramic cores such as additional intermediate ceramic cores and trailing edge ceramic cores could be utilized. The intermediate ceramic core 604 includes an upstream surface 620, a downstream surface 622, a pressure side surface 624, and a suction side surface 626, a first recessed area 628a on the pressure side surface 624 and a second recessed area 628b on the suction side surface 626.

A first RMC 608a includes a first end 630a, a second end 632a, a first side 634a, and a second side 636a. The first side 630a includes a contact surface 638a that is inserted into a recessed area 628a on the intermediate ceramic core 604. In the illustrated example, the contact surface 638a extends from the downstream surface 622 on the intermediate core 604 to approximately 40-80% of the spanwise length of the intermediate core 604. In another example, the contact surface 638a extends between 20-100% of the spanwise length of the intermediate core 604.

The first RMC 608a is attached to the first recessed area 628a of the intermediate core 604 with the ceramic adhesive 110. The ceramic adhesive 110 secures the contact surface 638a within the recessed area 628a so that the first RMC 608a is secured to the recessed area 628a on the intermediate ceramic core 604.

A second RMC 608b includes a first end 630b, a second end 632b, a first side 634b, and a second side 636b. The first side 630b includes a contact surface 638b that is inserted into a recessed area 628b on the intermediate ceramic core 604. In the illustrated example, the contact surface 638b extends from the downstream surface 622 on the intermediate core 604 to approximately 40-80% of the spanwise length of the intermediate core 604. In another example, the contact surface 638a extends between 20-100% of the spanwise length of the intermediate core 604.

The second RMC 608b is attached to the second recessed area 628b of the intermediate core 604 with the ceramic adhesive 110. The ceramic adhesive 110 secures the contact surface 638b within the recessed area 628b so that the second RMC 608b is secured to the recessed area 628b on the intermediate ceramic core 604.

Excess ceramic adhesive 110 forms at the interfaces forms at the interfaces of the first and second RMC 608a, 608b. The position of the excess ceramic adhesive 110 allows for easy access for removal by the tool 152.

FIG. 12 illustrates another example leading edge ceramic core 702 and another example intermediate ceramic core 704. Although FIG. 12 does not include a trailing edge ceramic core, additional ceramic cores such as additional intermediate ceramic cores and trailing edge ceramic cores could be utilized. The intermediate ceramic core 704 includes an upstream surface 720, a downstream surface 722, a pressure side surface 724, and a suction side surface 726. A recessed area 728 extends at least partially along the pressure side surface 724, the downstream surface 722, and the suction side surface 726.

A RMC 708 includes a first end 730, a second end 732, a first side 734, a second side 736, and a pair of tabs 740, 742. The first side 734 includes a contact surface 738 that is accepted within the recessed area 728 on the intermediate ceramic core 704. The contact surface 738 extends between distal ends of the pair of tabs 740, 742 on the first side 734. In the illustrated example, the pair of tabs 740, 742 extends from the downstream surface 722 on the intermediate core 704 to approximately 40-80% of the spanwise length of the intermediate core 704. In another example, the contact surface 738 extends between 20-100% of the spanwise length of the intermediate core 704.

Excess ceramic adhesive 110 forms at the interface of the pair of tabs 740, 742 and the intermediate ceramic core 704.

The position of the excess ceramic adhesive 110 allows for easy access for removal by the tool 152.

Although the RMCs shown in FIGS. 5-7 may be shown in a single ceramic core, the RMCs shown in FIGS. 5-7 could be used with in the other ceramic cores in the core assembly 100.

FIG. 13 illustrates another example trailing edge ceramic core 806. Although FIG. 13 does not include a leading edge ceramic core and an intermediate ceramic core, additional ceramic cores could be utilized. The trailing ceramic core 806 includes an upstream surface 820, a downstream surface 822, a pressure side surface 824, and a suction side surface 826. In the illustrated example, a recessed area 828 is formed along the entire pressure side 824 of the intermediate core 804.

A trailing RMC 808 is secured to the recessed area 828. The RMC 808 includes a first end 830, a second end 832, a first side 834, and a second side 836. A tab 838 extends from the first side 834 toward the upstream surface 820 of the intermediate ceramic core 804. A contact surface 840 extends along the first side 834 of the RMC 808 from the first end 830 to a distal end of the tab 838 for mating with the recessed area 828.

Excess ceramic adhesive 110 forms at the interfaces of the RMC 808 and the intermediate ceramic core 804. The position of the excess ceramic adhesive 110 allows for easy access for removal by the tool 152.

FIG. 14 illustrates another example RMC 908 adjacent a leading edge ceramic core 902 and an intermediate ceramic core 904. The RMC 908 includes a first end 930, a second end 932, a first side 934, and a second side 936. The leading edge ceramic core 902 and the intermediate ceramic core 904 are held together by a formation 935 that will form a first impingement hole fluidly connecting the leading edge ceramic core 902 and the intermediate ceramic core 904 in the cast component.

The second side 936 is located adjacent the leading edge ceramic core 902 and a pressure side 924 and a suction side 926 of the intermediate ceramic core 904. When the component 60 is cast, the RMC 908 will form a second impingement cooling passage 938 and a third impingement cooling passage 940 as shown in FIG. 15. The addition of the cooling second and third impingement cooling passages 938 and 940 will improve cooling of the component 60.

Excess ceramic adhesive 110 forms at the interfaces of the RMC 908 and the intermediate ceramic core 904. The position of the excess ceramic adhesive 110 allows for easy access for removal by the tool 152 along the trail edge, but not along the first side 934 of the RMC 908.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A core assembly comprising:
    a first core including:
        an exterior surface having a pressure side and a suction side extending between an upstream end and a downstream end; and
        a first recessed area extending along the pressure side; and
    a first insert including a first end, a second end, a first side, and a second side, wherein the first side includes a contact surface corresponding to and attached to the first recessed area and the second side opposite the contact surface is spaced from the first recessed area.

2. The core assembly of claim 1, wherein the first insert is a refractory metal core.

3. The core assembly of claim 2, wherein the first end of the first insert is aligned with the downstream end of the first core and spaced from the first recessed area.

4. The core assembly of claim 2, comprising a tab extending from the first side of the first insert.

5. The core assembly of claim 4, wherein a distal end of the tab is aligned with the upstream end of the first core and the first recessed area extends from the upstream end to the downstream end.

6. The core assembly of claim 4, wherein the first recessed area includes a slot for accepting the tab.

7. The core assembly of claim 2, wherein the first recessed area extends at least partially along the pressure side, the downstream end, and the suction side of the first core and the contact surface abuts to the first recessed area along the pressure side, the downstream end, and the suction side.

8. The core assembly of claim 7, wherein the first insert includes a first tab extending along the pressure side of the first core and a second tab extending along the suction side of the first core.

9. The core assembly of claim 2, comprising a leading edge core spaced from the first core, the leading edge core having a pressure side and a suction side extending between an upstream end and a downstream end, the first recessed area on the pressure side and the suction side of the first core and a second recessed area on the pressure side, the upstream end, and the suction side of the leading edge core and the first insert attached to the first recessed area and the second recessed area.

10. The core assembly of claim 2, wherein the first recessed area extends along the pressure side, the downstream end, and the suction side of the first core and the first and second ends of the first insert are spaced from the first core.

11. The core assembly of claim 10, wherein the first insert includes a first tab extending along the pressure side of the first core and a second tab extending along the suction side of the first core.

12. The core assembly of claim 11, wherein the first end and the second end of the first insert are located upstream of the downstream end of the first core.

13. The core assembly of claim 2, comprising a leading edge core spaced from the first core, the leading edge core having a pressure side and a suction side extending between an upstream end and a downstream end, the first recessed area on the pressure side, downstream end, and suction side of the first core, and a second recessed area on the pressure side, the upstream end, and the suction side of the leading edge core, and the first insert attached to the first recessed area and the second recessed area.

14. The core assembly of claim 1, wherein the first insert includes at least one bend.

15. The core assembly of claim 1, wherein the first insert is attached within the recessed area with an adhesive.

* * * * *